(12) United States Patent
Vummintala et al.

(10) Patent No.: US 7,477,698 B2
(45) Date of Patent: Jan. 13, 2009

(54) METHOD AND SYSTEM FOR RATE-2 TRANSMISSION

(75) Inventors: Shashidhar Vummintala, Santa Clara, CA (US); Arogyaswami Paulraj, Santa Clara, CA (US); Erik D. Lindskog, Santa Clara, CA (US); Balaji S. Rajan, Santa Clara, CA (US); Djordje Tujkovic, Santa Clara, CA (US)

(73) Assignee: Beceem Communications Inc., Santa Clara, CA (US)

( * ) Notice: Subject to any disclaimer, the term of this patent is extended or adjusted under 35 U.S.C. 154(b) by 563 days.

(21) Appl. No.: 11/205,504

(22) Filed: Aug. 16, 2005

(65) Prior Publication Data

US 2006/0034386 A1    Feb. 16, 2006

Related U.S. Application Data

(63) Continuation-in-part of application No. 11/175,430, filed on Jul. 5, 2005.

(60) Provisional application No. 60/606,358, filed on Aug. 31, 2004, provisional application No. 60/602,082, filed on Aug. 16, 2004.

(51) Int. Cl.
 *H04B 7/02*    (2006.01)

(52) U.S. Cl. ....................................... 375/267

(58) Field of Classification Search ................. 375/267, 375/299, 347, 349; 700/53; 455/101, 132–141
See application file for complete search history.

(56) References Cited

U.S. PATENT DOCUMENTS

| | | | |
|---|---|---|---|
| 5,479,448 A | 12/1995 | Seshadri | |
| 6,115,427 A | 9/2000 | Calderbank et al. | |
| 6,185,258 B1 | 2/2001 | Alamouti et al. | |
| 6,678,263 B1 | 1/2004 | Hammons, Jr. et al. | |
| 6,751,187 B2 | 6/2004 | Walton et al. | |
| 6,771,620 B2 | 8/2004 | Butler | |
| 6,775,332 B1 | 8/2004 | Li et al. | |
| 2002/0105961 A1 | 8/2002 | Hottinen et al. | |
| 2002/0193146 A1 | 12/2002 | Wallace et al. | |
| 2003/0026349 A1 | 2/2003 | Onggosanusi et al. | |
| 2003/0053410 A1 | 3/2003 | Williams et al. | |
| 2004/0047284 A1 | 3/2004 | Eidson | |
| 2004/0082356 A1 | 4/2004 | Walton et al. | |
| 2004/0179467 A1 | 9/2004 | Seeger et al. | |
| 2004/0196919 A1* | 10/2004 | Mehta et al. | 375/267 |

OTHER PUBLICATIONS

X. Lin and R. S. Blum "Improved Space-time codes using Serial Concatenation" IEEE Comm Letters vol. 4, No. 7, Jul. 2000 pp. 221-223.

(Continued)

*Primary Examiner*—Sam K Ahn

(57) ABSTRACT

Signal encoding in a multiple input multiple output system in a wireless communication network is provided. The communication system provides a method of encoding and transmitting symbols in a rate-2 complex symbol per second per Hertz transmission system that achieves a maximum diversity of four for a four transmit antenna system and a diversity of three on a three transmit antenna system. The communication system further provides a method of interleaving the complex symbols such that each interleaved symbol comprises information of at least two complex symbols where the complex symbols obtain values from a rotated constellation.

32 Claims, 4 Drawing Sheets

OTHER PUBLICATIONS

J. Kim et al., "An Improved Base Station Modulator Design for a CDMA Mobile System"; ETRI Journal, vol. 18, No. 4, Jan. 1997, pp. 215-227.

International Search Report PCT/US05/29302, Apr. 20, 2006.

Written Opinion of the International Searching Authority PCT/US05/29302, Apr. 20, 2006.

International Search Report PCT/US05/29303, Mar. 8, 2006.

Written Opinion of the International Searching Authority PCT/US05/29303, Mar. 8, 2006.

* cited by examiner

METHOD AND SYSTEM FOR RATE-2 TRANSMISSION

RELATED APPLICATION DATA

This application claims priority to and is a continuation-in-part of U.S. patent application Ser. No. 11/175,430, filed Jul. 5, 2005, and titled "A Method and System for Rate-2 Transmission". This application also claims priority to U.S. provisional application No. 60/602,082, filed Aug. 16, 2004, and titled "Communication System and Methods"; and, U.S. provisional application No. 60/606,358, filed Aug. 31, 2004, and titled "Communication System and Methods." This application is related to U.S. patent application Ser. No. 11/175,621, filed Jul. 5, 2005, and titled "A Method and System for Maximum Transmit Diversity".

FIELD OF THE INVENTION

The invention relates generally to the field of encoding of signals for the purpose of signal transmission in a wireless communication network comprising multiple transmit and receive antennas. More specifically the invention relates to a method deployed during transmitting symbols in a rate-2 complex symbol per second per Hertz transmission system while achieving maximum diversity.

BACKGROUND OF THE INVENTION

Reliability and speed of communications in a wireless network is increasingly crucial to serve growing user demands. This necessitates increasing constant improvements in technology.

Wireless communications systems can be deployed using a single transmit and a single receive antenna. The wireless channel distorts and adds other impairments to the received signal. These include additive noise, interference, time selective, frequency selective and space selective fading. Fading implies that the signal can be at different level at different antennas, or frequency or time. It is therefore important to transmit and or receive multiple replicas of the signal from multiple dimensions in space, frequency or time to increase the overall link reliability. This approach is known as diversity and is an important technique to assure reliable wireless communication over fading channels. Space diversity is obtained by using multiple antennas in the transmitter and/or in the receiver. When a multiple transmitter-receiver antenna system is deployed, not only can the reliability be improved but also the data rate can be enhanced.

Typically digital modulation of transmitted data is used. Example of such modulation schemes include M-ary quadrature amplitude modulation (QAM), M-ary phase shift keying (PSK) etc. Multiple access schemes are also employed to support multiple users. Multiple access schemes include code division multiple access (CDMA), time division multiple access (TDMA), orthogonal frequency division modulation (OFDM) and orthogonal frequency division modulation access (OFDMA) are employed. Multiple antenna schemes can be used with any modulation and multiple access scheme.

The data to be transmitted (e.g., the information bits) are encoded with a chosen coding scheme to generate coded bits. With multiple transmit antennas, coding includes the space dimension along with time or frequency dimensions and are specific to the number of transmit and receive antennas. The encoding scheme determines the diversity that can be captured, the transmission rate, and the decoding complexity at the receiver. The transmission rate refers to the average number of complex symbols that can be transmitted in one time slot or frequency bin. Transmission rate two requires at least 2 transmit and 2 receive antennas. A configuration with multiple transmit and receive antennas is known as MIMO (multiple input-multiple output).

Though different MIMO encoding schemes are available, these schemes do not simultaneously support transmission rate two, low complexity decoding at the receiver, maximum transmit diversity performance, and are not capable of being used with more than two transmit antennas. For example U.S. Pat. No. 6,185,258 describes the Alamouti code, a code which is only a rate one scheme and applicable to two transmit antennas only. Other schemes do not offer maximum diversity or low complexity decoding.

Since wireless systems sometimes operate with more than two (2) transmit antennas, there is a need to develop signal encoding schemes for a MIMO system with more than 2 transmit antennas, where the encoding schemes further support a transmission rate of two complex symbols per time slot or frequency bin, and also offers maximum diversity as well as low complexity decoding.

BRIEF DESCRIPTION OF THE DRAWINGS

The accompanying drawings when read in conjunction with the description show various embodiments of a method and system for signal transmission, but none of the embodiments shown herein are limited to the configurations shown.

FIG. 5(*b*) is a rotated QAM constellation, under an embodiment.

DETAILED DESCRIPTION OF THE INVENTION

Figure 1:
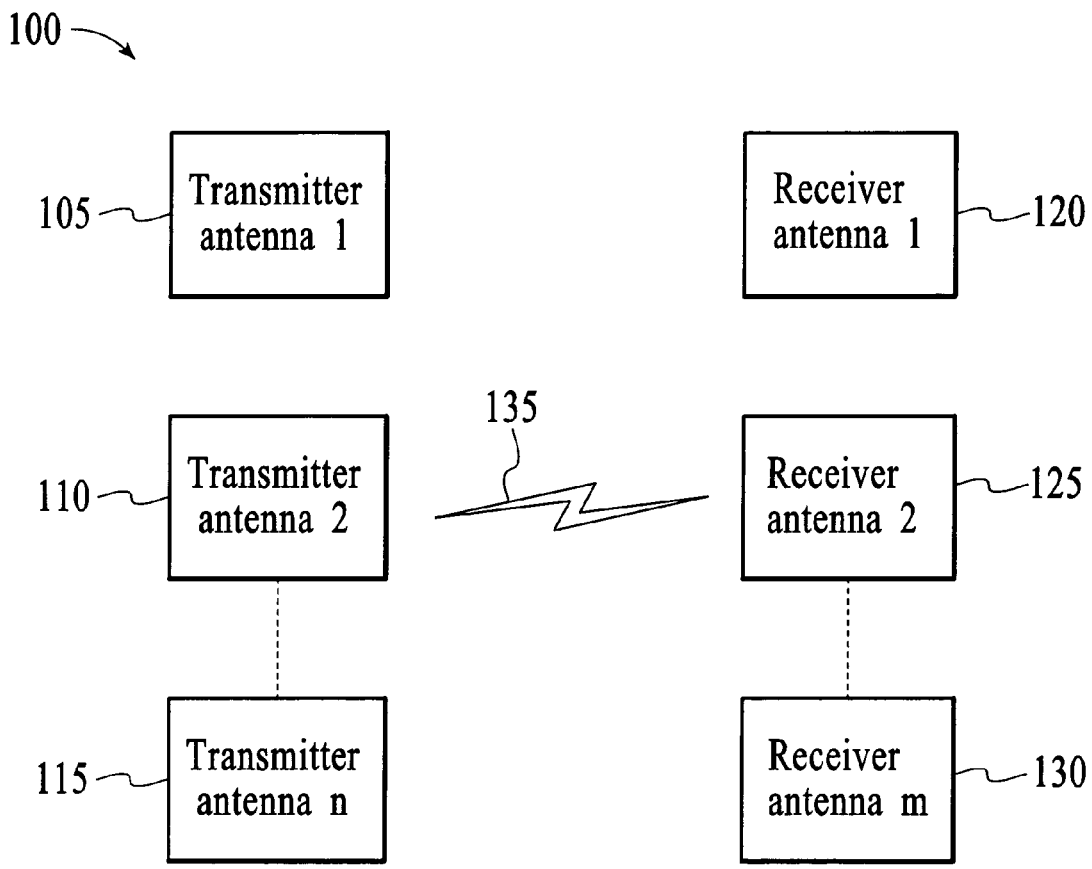
FIG. 1 is a block diagram of a multiple input multiple output (MIMO) communication system, under an embodiment.

FIG. 1 is a block diagram of a multiple input multiple output (MIMO) communication system 100, under an embodiment. The MIMO communication system 100 is a wireless communication system but is not so limited. The MIMO communication system 100 is also referred to herein as a "MIMO system" or "MIMO system 100" but is not so limited. While the MIMO communication system 100 is susceptible of embodiment in many different forms, there are shown in the figures and herein described in detail specific embodiments. It is understood however that the descriptions herein include examples of the principles of the invention and do not limit the MIMO communication system to the specific embodiments shown and/or described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements. The MIMO communication system may be embodied in several forms and manners, all of which are not described or shown herein. The invention shall have the full scope of the claims and is not to be limited by the embodiments shown below.

In wireless communication, since frequency-selective fading distorts the signal, a modulation scheme of the MIMO system 100 partitions the transmitted signal into a number of narrow "frequency subchannels", also referred to as frequency bins. Each subchannel is associated with a respective subcarrier upon which data is modulated, and may be viewed as an independent "transmission channel." As the subchannels are relatively narrow they are each generally free of any frequency domain distortion save a simple scaling.

The MIMO system 100 of an embodiment uses multiple transmitter and receiver antennas to increase reliability and rate of transmission in wireless channels. The MIMO system 100 of an embodiment includes methods and systems for the encoding and transmission of symbols. A signal undergoes encoding before transmission. Encoding generally determines the decoding mechanism. Once the encoding process has been completed, the signal is transmitted using the transmitter antennas. Any number of transmission schemes may be used for the transmission. A "Rate" is defined as the ratio of the number of complex symbols transmitted in one codeword to the product of the number of frequency sub-carriers and time slots used in the codeword. An embodiment of the MIMO system 100 discloses a method of encoding in a rate-2 complex symbols per second per hertz (eight symbols per codeword) transmission system using the multiple transmit antennas where the encoded symbols can be transmitted over three and four transmit antennas. Transmitting symbols in a Rate-2 transmitter system of an embodiment with three transmit antennas provides a diversity of three while four transmit antennas provides a diversity of four.

Referring to FIG. 1, the MIMO system 100 of an embodiment couples to one or more components of a wireless communications channel 135, alternatively referred to as transmission channel 135 or transmission medium 135. The MIMO system 100 of an embodiment includes a number "n" of transmit antennas 105, 110, 115 and a number "m" of receive antennas 120, 125, 130 for use in transmitting or transfering signals over the transmission channel 135. The number n of transmit antennas can include any number of antennas and, likewise, the number m of receive antennas can include any number of antennas. The number of transmit antennas may be the same as or different from the number of receive antennas. The receive antennas may be located on and/or coupled to any wireless receiver residing on a base station and located on any of a radio tower, access point or hub or station, and/or on any wireless enabled client device such as a wireless computer, wireless laptop and/or a hand held device, such as a mobile phone and/or a personal digital assistant (PDA). The number of receive antennas is typically not less than two (2). The transmit antennas can be located on and/or coupled to any wireless transmitter residing on a base station and located on any of a radio tower, access point or hub or station, and/or on any wireless enabled client device such as a wireless computer, wireless laptop and/or a hand held device, such as a mobile phone and/or a personal digital assistant (PDA). The data to be transmitted using components of the MIMO system is mapped onto a signal for transmission from the transmit antennas and, simultaneous with or subsequent to receipt, interpreted on the receiver. The receiver decodes information of the received signal to retrieve the original data. The transmitted signal may include video, audio, voice and/or other forms of data.

In order to encode the signal efficiently, each signal of an embodiment is represented in the form of complex symbols. A complex symbol used in the encoding process comprises a real part and an imaginary part but is not so limited. The degree of redundancy in the encoding process is related to the diversity sought in transmission. This redundancy can be incorporated as space, time or frequency block codes.

Figure 2:
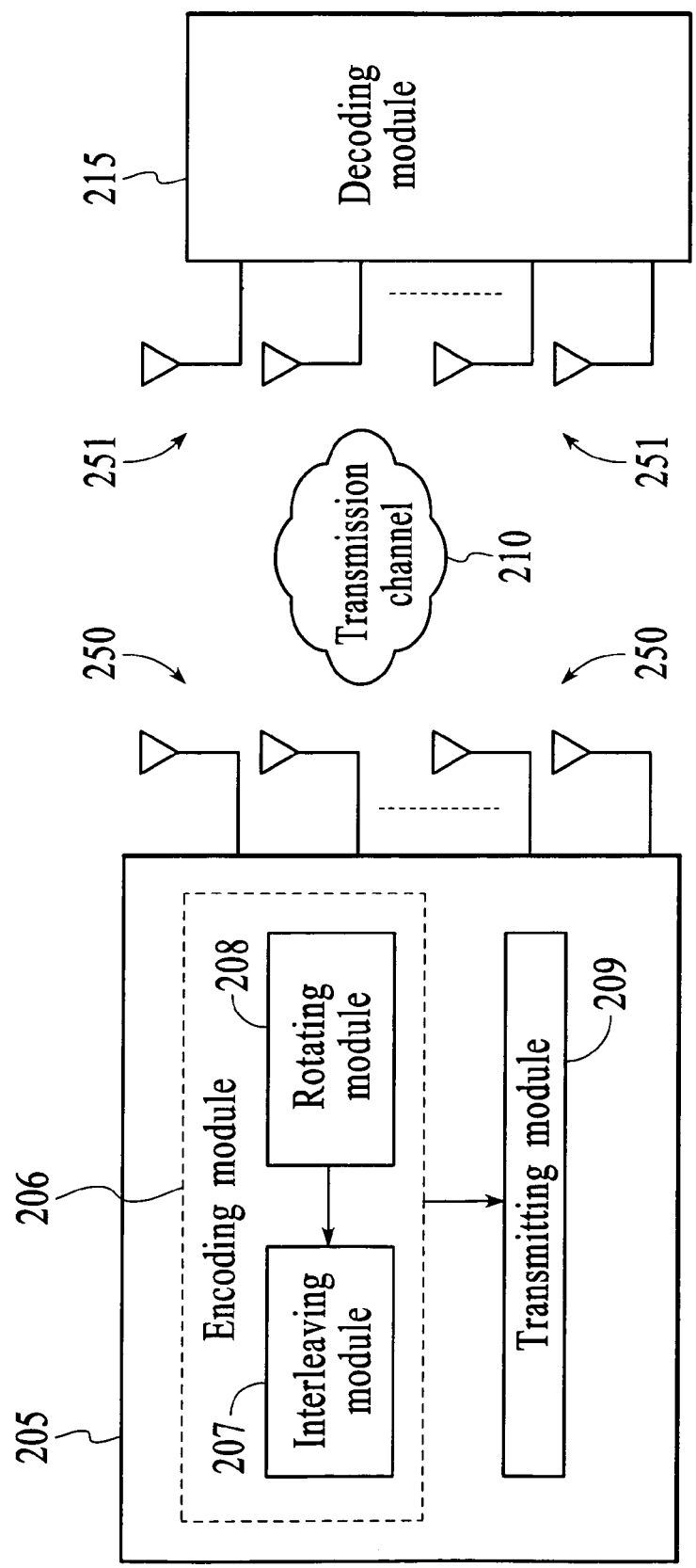
FIG. 2 is a block diagram of an antenna system of the MIMO communication system, under an embodiment.

FIG. 2 is a block diagram of an antenna system 205 of the MIMO communication system, under an embodiment. The MIMO communication system of an embodiment, which is a wireless communication system, comprises at least one transmitter antenna system 205. The transmitter antenna system 205 of an embodiment includes n transmit antennas 105, 110, 115, as described above with reference to FIG. 1. The transmitter receives a string of bits for transmission. The string of bits represents the data that is to be transmitted and therefore undergo encoding before transmission. The transmitter antenna system 205 is coupled to a plurality of transmit antennas 250 to enable a MIMO transmission. In one embodiment the transmitter antenna system 205 comprises three transmit antennas 250 and achieves a diversity of three due to the encoding and transmission techniques, explained below in greater detail. A maximum diversity of four generally may not be realized using three transmitter antennas as some interleaved symbols lack redundant symbols to assist in the decoding process, as described below with reference to FIG. 3.

The antenna system 205 further comprises an encoding module 206. The encoding module 206 further comprises a rotating module 208 and an interleaving module 207 coupled for communication with each other. The encoding module 206 is responsible for encoding the string of bits (complex symbols) and sending the encoded bits to the transmitting module 209. Similarly, the receiver components comprise a decoding module 215 coupled to a plurality of receiver antennas 251 in order to receive the encoded bits. The receiver antennas 251 of an embodiment include m receive antennas 120, 125, 130, as described above with reference to FIG. 1. The encoded bits on being decoded provide the original data that is being transmitted from the transmitter antenna system 205.

The transmitter antenna system 205 is coupled to three transmit antennas 250 and uses a rate-2 complex symbols per second per hertz (eight complex symbols per codeword) transmission scheme. The string of bits representing the data that is to be transmitted are mapped onto a constellation such as a Quadrature Amplitude Modulation (QAM) constellation for example. The transmitted complex symbols, eight complex symbols in a rate-2 scheme, take values from a constellation. The string of bits represents the base band signal, which is transmitted over the transmission channel using a carrier frequency. An embodiment of the MIMO system that transmits the eight complex symbols (chosen from the constellation) using three transmit antennas is explained below.

The encoding module 206 receives a set of eight symbols (Rate-2) that obtain values from a constellation. Each symbol in the constellation of an embodiment is represented in a different manner than each other symbol but the embodiment is not so limited. A complex symbol is two-dimensional and can be placed on a number plane defined by a real number axis (horizontal) and an imaginary number axis (vertical). Hence a complex number has a real part and imaginary part written in the form a+jb, where the variable "a" represents the position along the real axis, while the variable "b" represents the position along the imaginary axis. The two-dimensional values relate to the magnitude and phase of an electromagnetic wave traveling through free space. Any two symbols in the constellation of an embodiment have different real parts and different imaginary parts but are not so limited. Therefore, no two symbols in the constellation lie on a vertical or on a horizontal line of the complex plane. In the case where the constellation is not represented in this manner, the constellation is rotated by an angle (e.g., $0.5*\tan^{-1}(2)$), which results in a constellation with the above property. The constellation satisfying the above property is referred to as a rotated constellation as described below with reference to FIG. 5(b). The constellation may not be rotated if the constellation satisfies the above property.

The set of eight complex symbols to be transmitted, chosen from the constellation, are represented as $x_1, x_2, x_3, x_4, x_5, x_6, x_7$ and $x_8$. Although the set of eight symbols chosen from the constellation can be the same symbol with the same real and imaginary parts, the constellation that each symbol from the set of eight symbols is chosen from is represented in a different manner than each other symbol. Therefore, the real part of a symbol from the constellation is different from the real part of any other symbol and the imaginary part of a symbol from the constellation is different from the imaginary part of any other symbol of the constellation. However, the real part of one symbol can be equal to the imaginary part of another symbol in the constellation. The symbols that obtain values from the constellation (i.e. $x_1, x_2, x_3, x_4, x_5, x_6, x_7$ and $x_8$) are then interleaved. Interleaving is a process in which the real part of a first complex symbol is combined with an imaginary part of a second complex symbol, and the real part of the second complex symbol is combined with the imaginary part of the first complex symbol. For example, using the symbols above, the real part of a complex symbol $x_1$ is combined with an imaginary part of complex symbol $X_7$ and the real part of $x_2$ is combined with the imaginary part of $x_8$. For example, as per one embodiment, the interleaving can be as follows:

$$\tilde{X}_1 = x_{1I} + j\, x_{7Q};$$

$$\tilde{X}_2 = x_{2I} + j\, x_{8Q};$$

$$\tilde{X}_3 = x_{3I} + j\, x_{5Q};$$

$$\tilde{X}_4 = x_{4I} + j\, x_{6Q};$$

$$\tilde{X}_5 = x_{5I} + j\, x_{3Q};$$

$$\tilde{X}_6 = x_{6I} + j\, x_{4Q};$$

$$\tilde{X}_7 = x_{7I} + j\, x_{1Q};$$

$$\tilde{X}_8 = x_{8I} + j\, x_{2Q};$$

where $\tilde{X}_1, \tilde{X}_2, \tilde{X}_3, \tilde{X}_4, \tilde{X}_5, \tilde{X}_6, \tilde{X}_7$ and $\tilde{X}_8$ are the set of eight interleaved symbols corresponding to the set of eight complex symbols chosen from the constellation. The symbols each satisfy the relation, $x_i = x_{iI} + j\, x_{iQ}$, where $i = 1, 2, 3 \ldots 8$ and $j = \sqrt{-1}$. The interleaving module 207 combines the symbols in a manner where each interleaved symbol comprises information of two symbols from the set of the eight symbols. This is possible because each interleaved symbol includes the combination of the real part of one symbol and the imaginary part of another symbol. The interleaving can be performed using various permutations and combinations of each of the symbols chosen from the constellation.

The encoding module 206 transfers the set of eight interleaved symbols to a transmitting module 209 for transmitting. The transmitting module 209 transmits the set of eight interleaved symbols using the three transmit antennas 250. The interleaved symbols of an embodiment can be represented as a matrix where each row of the matrix represents or corresponds to an antenna of the transmitter antennas and the symbols are transmitted using the transmitter antennas 250. The matrix provides a representation of the interleaved symbols in an embodiment, and other ways of representing the interleaved symbols can also be used as all such ways are within the scope of the MIMO system of an embodiment. As stated previously, the set of eight interleaved symbols corresponding to the set of eight symbols chosen from the constellation are subjected to a process that generates a complex conjugate and a negative complex conjugate of each interleaved symbol to incorporate redundancy during transmission. Redundantly transmitting a selected few of the set of eight interleaved symbols in different forms, such as a complex conjugate and a negative complex conjugate of the interleaved symbols, provides additional support to the decoding module to retrieve the original data accurately in cases where symbol information is lost in the transmission channels 210 due to the presence of extraneous factors.

In an embodiment, two transmit antennas of the three transmit antennas transmit a predetermined combination of a first four interleaved symbols, a complex conjugate of the first four interleaved symbols and a negative complex conjugate of the first four interleaved symbols from the set of eight interleaved symbols in a predetermined manner over a first transmission sub-carrier channel of the transmission channels 210 (individual channels not shown). The transmit antennas also transmit a predetermined combination of a second four interleaved symbols, a complex conjugate of the second four interleaved symbols and a negative complex conjugate of the second four interleaved symbols from the set of eight interleaved sub-carrier symbols in a manner over a second transmission sub-carrier channel of the transmission channels 210. The transmission ensures that each transmitter antenna of the three transmitter antennas transmits information (real part and/or imaginary part) about each symbol from the set of eight symbols over two channels of the transmission channels 210. The arrangement of the interleaved symbols is such that they are transmitted over two transmission channels using three or four antennas.

The "transmission sub-carrier channel" described above refers to a tone or frequency over which the symbols are transmitted Since the interleaving module 207 ensures that each interleaved symbol comprises information of two complex symbols, the transmitter antenna while transmitting each interleaved symbol is in essence transmitting information of two complex symbols. The interleaving process of an embodiment enables a diversity of three for a three transmitter antenna system but is not so limited. The interleaved symbols can be transmitted based on various permutations as long as each transmitter antenna transmits information of each symbol form the set of eight symbols in a rate-2 transmission scheme.

In the case of a four antenna transmit system the transmission ensures that each transmitter antenna of the four transmitter antennas transmits information (real part and/or imaginary part) about each symbol from the set of eight symbols over two of the transmission channels 210 at two time instances.

Figure 3:
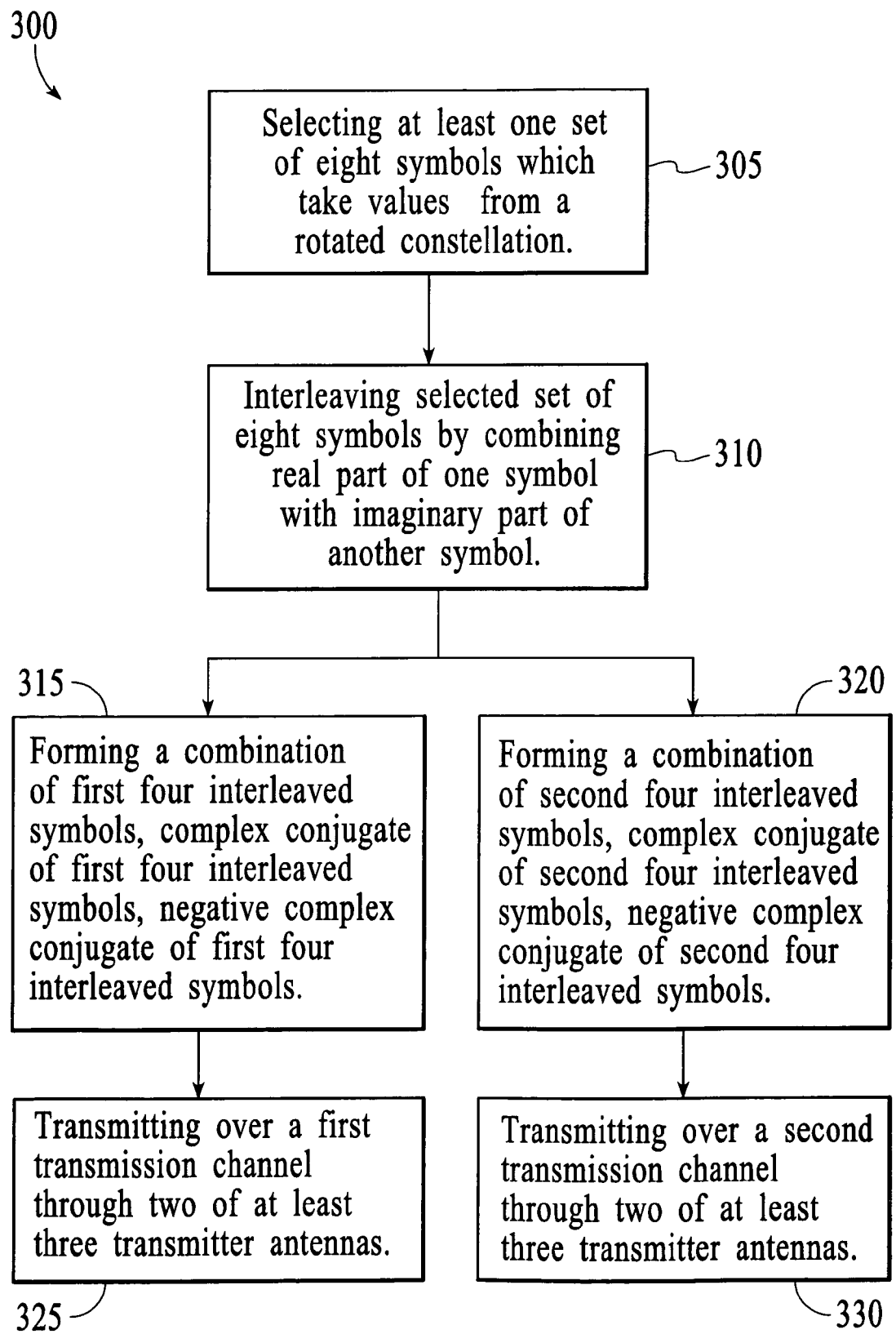
FIG. 3 is a flow diagram for encoding an input signal set in the MIMO communication system, under an embodiment.

FIG. 3 is a flow diagram for encoding and transmitting 300 the set of eight symbols of an input signal set, under an embodiment. The components of the antenna system 205 (FIG. 2) execute or control the encoding and transmitting 300 in an embodiment. The MIMO system of an embodiment maps a string of bits that represent data to be transmitted onto constellation points. Components of the MIMO system select 305 at least one set of eight symbols, which obtain values from the constellation points. The same signal point from the constellation can be chosen for the set of eight symbols but the embodiment is not so limited. In an embodiment, eight different symbols are chosen from the constellation. Each signal point in the constellation has a different representation compared to the other symbol. If the representation of the signal points is the same (the real or imaginary part of at least one signal point is the same as the real and imaginary part of any other signal point) the constellation is rotated. The rotation of an embodiment is $0.5*\tan^{-1}(2)$ but the embodiment is not so limited.

Assuming for example that the set of eight symbols is represented as $x_1, x_2, x_3, x_4, x_5, x_6, x_7$ and $x_8$, then $x_1, x_2, x_3, x_4, x_5, x_6, x_7$ and $x_8$ can take the same value or different values from the constellation. In an embodiment, $x_1, x_2, x_3, x_4, x_5, x_6, x_7$ and $x_8$ are different signal points chosen from a rotated constellation. The set of eight symbols are then interleaved 310. The interleaving 310 of the symbols ensures that each interleaved symbol comprises information of two symbols from the set of eight symbols. This achieves a diversity of three on a three transmitter antenna system but is not so limited. In an embodiment, the interleaving process combines the real part of one symbol with the imaginary part of another symbol. The result is that each interleaved signal includes a real part of one signal and an imaginary part of another signal. For the set of symbols $x_1, x_2, x_3, x_4, x_5, x_6, x_7$ and $x_8$ the interleaving process can be done in several ways. For example, $\tilde{X}_1 = x_{1I} + j\, x_{7Q}$ $\tilde{X}_2 = x_{2I} + j\, x_{8Q}$ $\tilde{X}_3 = x_{3I} + j\, x_{5Q}$ $\tilde{X}_4 = x_{4I} + j\, x_{6Q}$ $\tilde{X}_5 = x_{5I} + j\, x_{3Q}$ $\tilde{X}_6 = x_{6I} + j\, x_{4Q}$ $\tilde{X}_7 = x_{7I} + j\, x_{1Q}$ $\tilde{X}_8 = x_{8I} + j\, x_{2Q}$ where $\tilde{X}_1, \tilde{X}_2, \tilde{X}_3, \tilde{X}_4, \tilde{X}_5, \tilde{X}_6, \tilde{X}_7, \tilde{X}_8$ are the set of eight interleaved symbols corresponding to the set of eight symbols. The set of eight interleaved symbols $\tilde{X}_1, \tilde{X}_2, \tilde{X}_3, \tilde{X}_4, \tilde{X}_5, \tilde{X}_6, \tilde{X}_7, \tilde{X}_8$ can be interleaved in several different ways and all such ways are within the scope of the MIMO system described herein.

In order to incorporate redundancy during transmission to account for the loss due to transmission channel fading, noise, interference and/or any other form of loss or degrading of signal, each interleaved symbol is replicated in the form of a complex conjugate and a negative complex conjugate. Performing a complex conjugate and a negative complex conjugate changes the sign of a certain term in the complex symbol and can be used to get additional information of the complex symbol in the event of a loss of signal in the transmission channel. For example, if the interleaved symbol $\tilde{X}_2$ which comprises information of complex symbols $x_2$ and $x_8$ suffers interference, the complex conjugate of $\tilde{X}_2$ represented as $\tilde{X}_2{}^*$ can be used to retrieve information of the original channel symbol.

Once the complex symbols have been interleaved, in one embodiment, they are arranged in a matrix where each row of the matrix corresponds to a transmitter antenna. Pursuant to one embodiment, the matrix can be represented as follows for a three transmit antenna system. This matrix is presented to depict a representation for transmission of the interleaved symbols and any structure that enables transmission in the manner described herein can be used and is within the scope of the MIMO systems of an embodiment.

| $\tilde{X}_1$ | $\tilde{(-X_2)}^*$ | $\tilde{X}_5$ | $\tilde{(-X_6)}^*$ |
| $\tilde{X}_2$ | $\tilde{X}_1{}^*$ | $\tilde{X}_6$ | $\tilde{X}_5{}^*$ |
| $\tilde{X}_3$ | $\tilde{X}_4$ | $\tilde{X}_7$ | $\tilde{X}_8$ |

Each row of the matrix represents a transmitter antenna, where the first two columns of the matrix represent a first transmission sub-carrier channel (a specified frequency for transmission), and the last two columns of the matrix represent a second transmission sub-carrier channel. The interleaved symbols in the first column and the third column of the matrix are transmitted at the first time and the interleaved symbols in the second column and the fourth column of the matrix are transmitted at the second time in an embodiment. However, the interleaved symbols from the first two columns are transmitted over a first transmission sub-carrier channel and the interleaved symbols from the last two columns are transmitted over a second transmission channel.

Subsequent to and/or simultaneous with the interleaving operation, a combination of a first four interleaved symbols, a complex conjugate of the first four interleaved symbols and a negative complex conjugate of the first four interleaved symbols from the set of eight interleaved symbols are generated 315 and transmitted 325 over a first transmission channel using two transmit antennas from the three transmit antennas.

Further, a combination of a second four interleaved symbols, a complex conjugate of the second four interleaved symbols and a negative complex conjugate of the second four interleaved symbols from the set of eight interleaved symbols are generated 320 and transmitted 330 over a second transmission sub-carrier channel using two transmit antennas from the three transmit antennas.

For example, in the embodiment of the matrix provided above, the first antenna transmits interleaved symbol $\tilde{X}_1$ and a negative complex conjugate of $\tilde{X}_2$ represented as $-\tilde{(X_2)}^*$ on the first transmission channel and interleaved symbol $\tilde{X}_5$ and negative complex conjugate of $\tilde{X}_6$ represented as $-\tilde{(X_6)}^*$ on the second transmission channel. Hence, $\tilde{X}_1$ comprises information of complex symbol $x_1$ and complex symbol $X_7$ while $-\tilde{(X_2)}^*$ comprises information of complex symbol $x_2$ and complex symbol $x_8$. The second transmit antenna transmits interleaved symbol $\tilde{X}_2$ and complex conjugate of interleaved symbol $\tilde{X}_1$ on the first transmission channel and interleaved symbol $\tilde{X}_6$ and a complex conjugate of $\tilde{X}_5$ represented as $\tilde{(X_5)}^*$ on the second transmission channel. The arrangement of the interleaved symbols for transmission is such that the interleaved symbols of the first row of the matrix and the interleaved symbols of the second row of the matrix, being transmitted over the first transmission sub-carrier channel retain an orthogonal property. Similar to the first transmit antenna, the set of four interleaved symbols transmitted using the second transmit antenna also comprise information of each complex symbol and in addition incorporate redundancy with the transmission of complex conjugates and negative complex conjugates of the interleaved symbols.

The third transmit antenna transmits interleaved symbol $\tilde{X}_3$ and $\tilde{X}_4$ over the first transmission sub-carrier channel and interleaved symbol $\tilde{X}_7$ and $\tilde{X}_8$ over the second transmission sub-carrier channel. The interleaved symbols in the first column of the matrix and the third column of the matrix are transmitted at the first time instance and the interleaved symbols in the second column of the matrix and the fourth column of the matrix are transmitted at the second time instance.

The encoding process for three transmitter antennas achieves a diversity of three and may not achieve a maximum diversity of four. This is because, as per the embodiment disclosed above, the last row of the matrix representation transmits interleaved symbols $\tilde{X}_3$, $\tilde{X}_4$, $\tilde{X}_7$, $\tilde{X}_8$ without their corresponding redundant interleaved symbols. While information of each of the other complex symbols, for example $x_1$ is transmitted using the interleaved symbol $\tilde{X}_1$, the complex conjugate of $\tilde{X}$ namely $\tilde{X}_1^*$ and the interleaved symbol $\tilde{X}_7$ each of which comprises information of $x_1$, the interleaved symbols $\tilde{X}_3$, $\tilde{X}_4$, $\tilde{X}_7$, $\tilde{X}_8$ do not have such corresponding redundant symbols to assist in the decoding process. Hence the maximum achievable diversity may be three in the case of three transmit antennas. The encoding incorporates a time, space and frequency division multiplexing simultaneously but is not so limited.

In at least one alternative embodiment, the third transmit antenna can also transmit interleaved symbol $\tilde{X}_3$ and a negative complex conjugate of interleaved symbol $\tilde{X}_4$ namely $\tilde{(-X_4)}^*$ over the first transmission sub-carrier channel and interleaved symbol $\tilde{X}_7$ and a negative complex conjugate of interleaved symbol $\tilde{X}_8$ namely $\tilde{(-X_8)}^*$ on the second transmission sub-carrier channel as shown in the following matrix.

| | | | |
|---|---|---|---|
| $\tilde{X}_1$ | $\tilde{(-X_2)}^*$ | $\tilde{X}_5$ | $\tilde{(-X_6)}^*$ |
| $\tilde{X}_2$ | $\tilde{X}_1^*$ | $\tilde{X}_6$ | $\tilde{X}_5^*$ |
| $\tilde{X}_3$ | $\tilde{(-X_4)}^*$ | $\tilde{X}_7$ | $\tilde{(-X_8)}^*$ |

In an embodiment that uses four transmit antennas, the arrangement of the matrix is as shown in the following matrix, where each row of the matrix represents a transmit antenna.

| | | | |
|---|---|---|---|
| $\tilde{X}_1$ | $\tilde{(-X_2)}^*$ | $\tilde{X}_5$ | $\tilde{(-X_6)}^*$ |
| $\tilde{X}_2$ | $\tilde{X}_1^*$ | $\tilde{X}_6$ | $\tilde{X}_5^*$ |
| $\tilde{X}_3$ | $\tilde{(-X_4)}^*$ | $\tilde{X}_7$ | $\tilde{(-X_8)}^*$ |
| $\tilde{X}_4$ | $\tilde{X}_3^*$ | $\tilde{X}_8$ | $\tilde{X}_7^*$ |

Each transmit antenna transmits information of all symbols over multiple antennas. For example, in the system using four transmit antennas, each of the four transmit antennas of an embodiment transmits information of all symbols over two transmission channels; alternative embodiments may use a different number of transmission channels. The method of encoding and transmission using four transmit antennas is similar to the one described above for three transmit antennas. Maximum diversity of four is achieved using the encoding method disclosed above on a four transmit antenna system. This is because, as per the embodiment disclosed above, every interleaved symbol has a corresponding redundant interleaved symbol within the matrix representation thereby achieving a diversity of four. The set of four interleaved symbols can be replaced by other interleaved symbols in any manner such that each transmitter antenna transmits information of all four symbols while incorporating redundancy.

Figure 4:
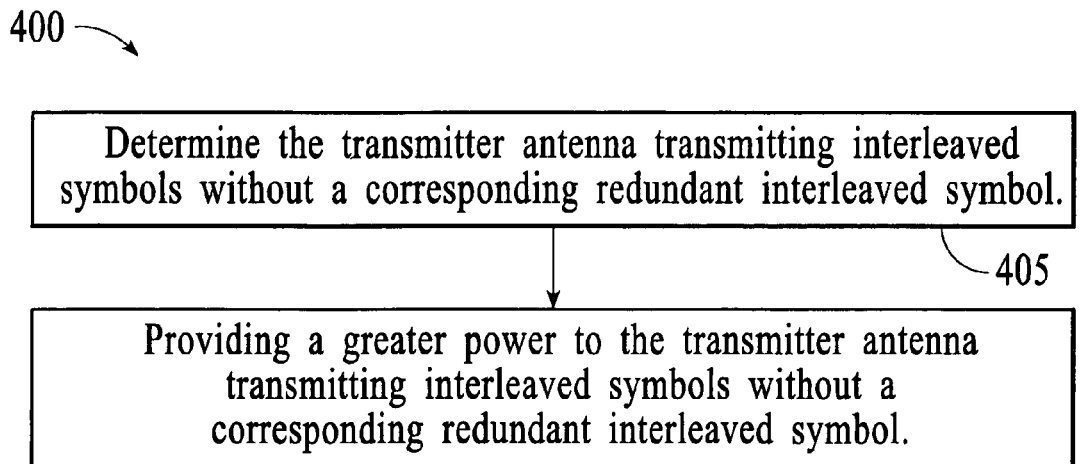
FIG. 4 is a flow diagram for uniform antenna loading in the MIMO communication system, under an embodiment.

FIG. 4 is a flow diagram for proportionate allotment of power 400 to each transmitter antenna in the MIMO communication system, under an embodiment. The components of the antenna system 205 (FIG. 2) execute or control the power allotment 400 in an embodiment. Components of the transmitter system of the MIMO system of an embodiment allots power 400 to antennas by determining 405 which transmitter antenna transmits interleaved symbols without a corresponding redundant interleaved symbol. The transmitter system provides 410 greater power to the transmitter antenna transmitting interleaved symbols without a corresponding redundant interleaved symbol. For example, the last row of the matrix representation transmits interleaved symbols $\tilde{X}_3$, $\tilde{X}_4$, $\tilde{X}_7$, $\tilde{X}_8$ without their corresponding redundant interleaved symbols. To improve the signal to noise ratio, the third transmitter antenna transmitting the interleaved symbols without their corresponding redundant interleaved symbols is supplied greater power to increase the strength of the signal based on a weighted average of the number of interleaved symbols. Increasing the signal strength may reduce the amount of interference the signal may suffer during transmission. For example, in order to attain data protection, unequal power is allotted to the available antennas so that the antenna transmitting the weaker symbols (e.g., the symbols without the supporting redundant symbols) are allotted more power than symbols that have corresponding redundant symbols to assist in the decoding process. Matrix "B" that follows represents the unequal allotment of power to transmit antennas in the MIMO system of an embodiment.

$$B = \begin{bmatrix} \sqrt{3/4} & 0 & 0 \\ 0 & \sqrt{3/4} & 0 \\ 0 & 0 & \sqrt{3/2} \end{bmatrix}$$

The effect of multiplying with the matrix B above is to allocate to the third antenna twice the power that is allocated to the first two antennas.

With the power weighing matrix as above, the system performance will improve, but the diversity of the code still remains 3 irrespective of the channels in the two sub-carrier channels. When however the fading in the two sub-carrier channels is not completely dependent the maximum diversity may not be achieved. To achieve maximum diversity, the components of the MIMO system of an embodiment use the following weighting matrix, $$\frac{1}{\sqrt{2}} \begin{bmatrix} 1 & 0 & e^{j\sqrt{2}} \\ 0 & 1+e^{j\sqrt{2}} & 0 \\ e^{j\sqrt{2}} & 0 & 1 \end{bmatrix}$$

Figure 5A:
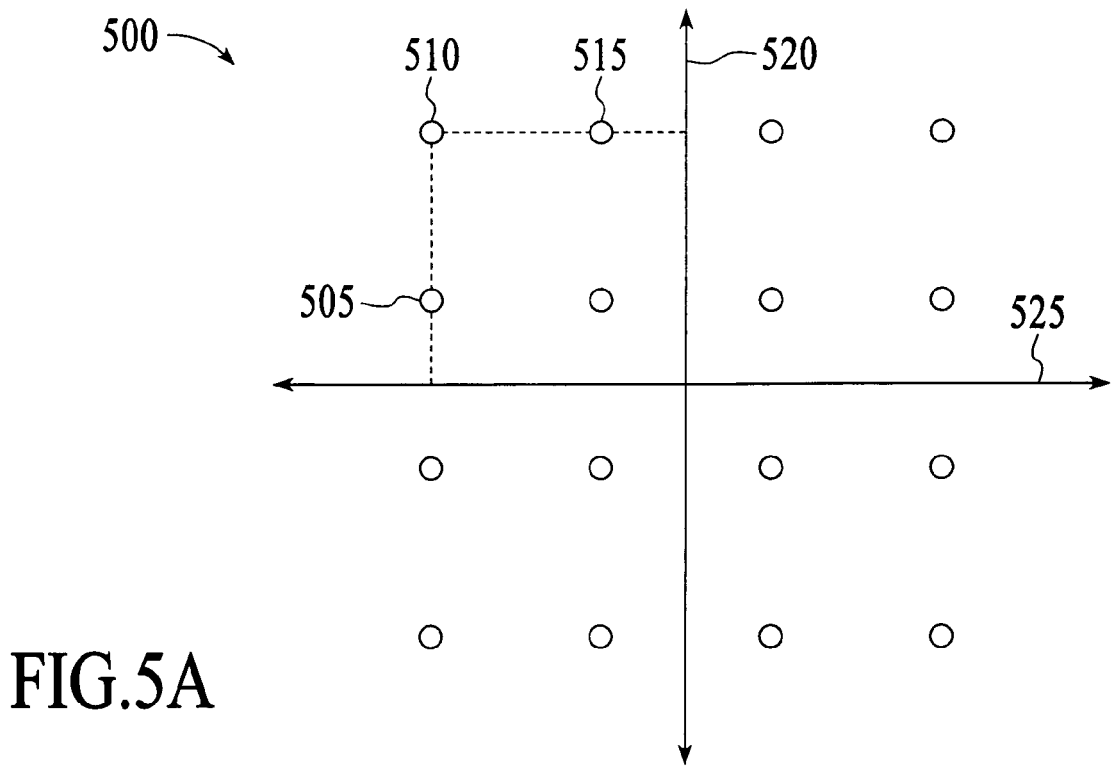
FIG. 5(*a*) is a regular quadrature amplitude modulation (QAM) constellation, under an embodiment.

FIG. 5(a) is a regular QAM constellation 500, under an embodiment. Some symbols from the set of symbols being represented by signal points have the same real or imaginary part as another symbol from the set of symbols. The horizontal axis 525 represents the real axis and the vertical axis 520 represents the imaginary axis. For example, complex symbol 505 has the same real part as complex symbol 510 and complex symbol 510 has the same imaginary part as complex symbol 515.

Figure 5B:
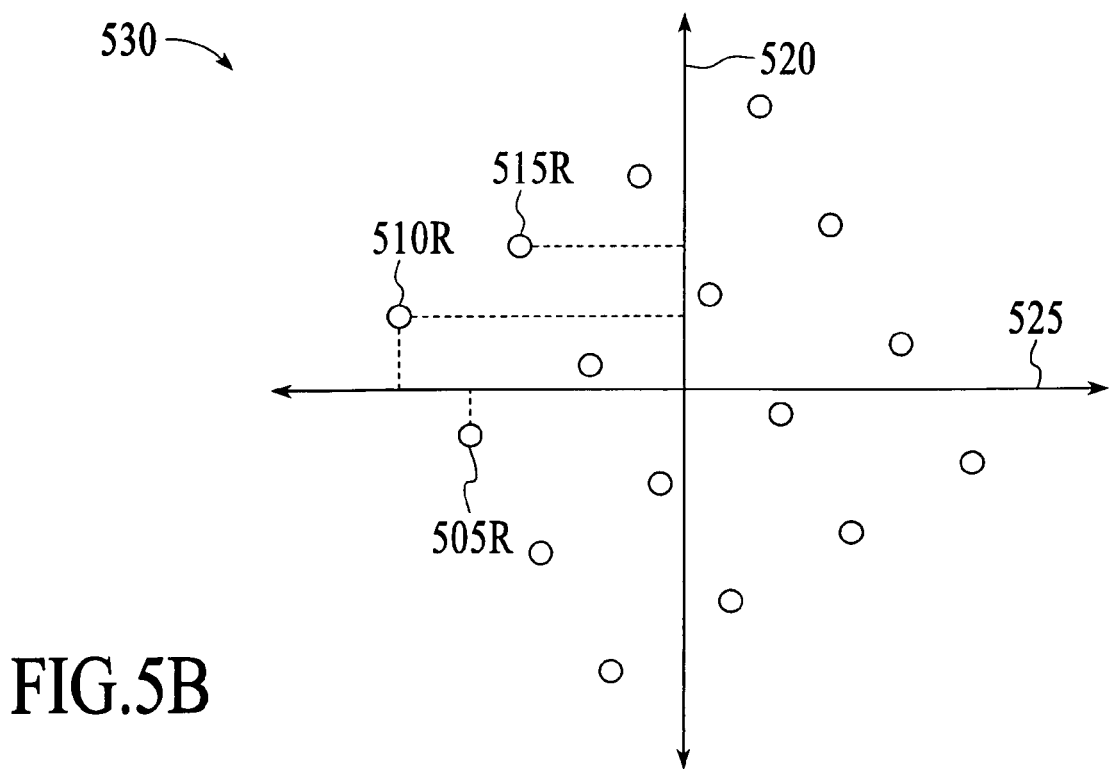

FIG. 5(b) is a rotated QAM constellation 530, under an embodiment. The rotated constellation 530 of this example rotates the regular QAM constellation 500 by a predetermined angle, for example $0.5*\tan^{-1}(2)$, to obtain the rotated constellation 530. Alternative embodiments may rotate the regular QAM constellation 500 by any amount. The rotated constellation 530 comprises points such that no two symbols from the set of symbols have the same real or imaginary part as another symbol. For example, complex symbol 505R, after rotation has a different real part than the complex symbol 510R and a different real part than all complex symbols of the constellation, and complex symbol 510R, after rotation has a different imaginary part than complex symbol 515R and different imaginary part than all complex symbols of the constellation. It is obvious to those skilled in the art that the real part of one complex symbol can be the same as the imaginary part of another complex symbol.

Each publication and patent application mentioned in this specification is herein incorporated by reference in its entirety to the same extent as if each individual publication or patent application was specifically and individually indicated to be incorporated by reference.

The MIMO communication system described herein includes a method for transmitting data, the method comprising at least one of selecting a first plurality of symbols from a set of symbols, the first plurality of symbols representing data, encoding the first plurality of symbols to form a second plurality of symbols, each symbol of the second plurality of symbols generated by combining a first part of a first symbol with a second part of a second symbol, the first and second symbols selected from the first plurality of symbols, and transmitting a combination of information of the second plurality of symbols using a plurality of antennas, wherein each antenna of the plurality of antennas transmits information of each symbol of the second plurality of symbols over at least two channels.

The set of symbols of an embodiment represent a plurality of points of a rotated constellation.

The first plurality of symbols of an embodiment includes a set of eight symbols.

The second plurality of symbols of an embodiment includes a set of eight interleaved symbols.

The combination of information of an embodiment includes a first four symbols of the second plurality of symbols, a complex conjugate of the first four symbols of the second plurality of symbols, and a negative complex conjugate of the first four symbols of the second plurality of symbols.

The method of an embodiment further comprises generating the rotated constellation by rotating a constellation that includes the set of symbols when at least one of a real and an imaginary part of one symbol of the set of symbols has a same real or an imaginary part as another symbol of the constellation. The rotating of an embodiment includes an angle of approximately $0.5*\tan^{-1}(2)$.

The transmitting of an embodiment further comprises incorporating redundancy in the second plurality of symbols by including a conjugate of an interleaved symbol for each interleaved symbol in the second plurality of symbols.

The transmitting of an embodiment further comprises incorporating redundancy in the second plurality of symbols by forming a negative complex conjugate of an interleaved symbol for each interleaved symbol in the second plurality of symbols.

The transmitting of an embodiment further comprises at least one of identifying a transmitter antenna of the plurality of antennas transmitting interleaved symbols without a corresponding redundant interleaved symbol, and providing a greater power to the identified transmitter antenna in response to a weighted average of the number of interleaved symbols.

The MIMO communication system described herein includes an apparatus for transmitting, the apparatus comprising at least one of an encoder configured to receive a set of eight interleaved symbols corresponding to a set of eight symbols that represent data, each interleaved symbol from the set of eight interleaved symbols being created by combining a first part of one symbol with a second part of one other symbol, the symbol and the one other symbol forming part of the set of eight symbols, and a replication of a conjugate of each interleaved symbol and a negative complex conjugate of each interleaved symbol, a module coupled to the encoder and configured to arrange the set of eight interleaved symbols in a matrix, and a transmitter coupled to the encoder and the module, wherein contents of the matrix control transmission of the data by the transmitter, wherein each row of the matrix corresponds to one of the plurality of antennas and each antenna of the plurality of antennas transmits information of each symbol of the set of eight interleaved symbols over at least two channels. The matrix of an embodiment includes at least three rows and four columns.

The matrix of an embodiment further comprises at least one of a first row with a combination of a first interleaved symbol, a negative complex conjugate of a second interleaved symbol from the set of eight interleaved symbols in a first two columns of the matrix, a third interleaved symbol and a negative complex conjugate of a fourth interleaved symbol from the set of eight interleaved symbols in a last two columns of the matrix, a second row with a combination of a complex conjugate of the first interleaved symbol and the second interleaved symbol from the set of eight interleaved symbols in the first two columns of the matrix and a complex conjugate of the third interleaved symbol and the fourth interleaved symbol from the set of eight interleaved symbols in the last two columns of the matrix, and a third row with a combination of a fifth interleaved symbol, a negative complex conjugate of a sixth interleaved symbol from the set of eight interleaved symbols in a first two columns of the matrix, a seventh interleaved symbol and a negative complex conjugate of an eighth interleaved symbol from the set of eight interleaved symbols in a last two columns of the matrix, the first two columns representing a first transmission sub-carrier channel and the last two columns representing a second transmission sub-carrier channel.

The set of eight symbols of an embodiment is selected from a set of symbols represented by a rotated constellation, each symbol from the set of symbols is represented in a different manner than another symbol from the set of symbols.

The constellation of an embodiment is rotated by an angle, $0.5\tan^{-1}(2)$ if at least one of a real and an imaginary part of one symbol from the set of symbols has at least one of a same real and an imaginary part as another symbol from the set of symbols.

The matrix of an embodiment further comprises a fourth row representing a fourth transmitter antenna transmitting a combination of the sixth interleaved symbol, a complex conjugate of the fifth interleaved symbol from the set of eight interleaved symbols in a first two columns of the matrix, the eighth interleaved symbol and a complex conjugate of the seventh interleaved symbol from the set of eight interleaved symbols in a last two columns of the matrix.

The first part of an embodiment is a real part of the symbol and the second part is an imaginary part of the other symbol.

The MIMO communication system described herein includes a system comprising at least one of an encoding module configured to receive at least one set of eight symbols from a set of symbols, an interleaving module of the encoding module, the interleaving module configured to interleave each symbol from the set of eight symbols with a corresponding combining symbol to generate a set of eight interleaved symbols corresponding to the set of eight symbols, and a transmitting module of the encoding module, the transmitting module configured to transmit a combination of information of the set of eight interleaved symbols using a plurality of antennas, wherein each antenna of the plurality of antennas transmits information of each interleaved symbol of the set of eight interleaved symbols over at least two channels.

The combination of information of an embodiment includes a first four interleaved symbols from the set of eight interleaved symbols, a complex conjugate of the first four interleaved symbols and a negative complex conjugate of the first four interleaved symbols.

The set of symbols of an embodiment is represented by a rotated constellation in which each symbol from the set of symbols is represented in a different manner from each other symbol from the set of symbols.

Each interleaved symbol from the set of eight interleaved symbols of an embodiment comprises information of the symbol and the corresponding combining symbol, the symbol and the corresponding combining symbol forming a part of the set of eight symbols.

The system of an embodiment further comprises a rotating module configured to rotate a constellation if at least one of a real and an imaginary part of one symbol of the constellation has a same at least one of a real and an imaginary part of another symbol of the constellation to generate a rotated constellation.

The encoding module and the transmitting module of an embodiment are integrated within a single module. The single module of an embodiment can be implemented as part of at least one of a base station and a subscriber station. The single module of an embodiment is a processor-based module.

The encoding module and the transmitting module of an embodiment are configured to transmit the set of eight interleaved symbols using an additional transmitter antenna in a predetermined manner.

At least one set of eight symbols of an embodiment are transmitted over a wireless medium.

The MIMO communication systems described herein therefore provide encoding and transmission methods using three or four antennas. Aspects of the MIMO communication system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the MIMO communication system include: microcontrollers with memory (such as electronically erasable programmable read only memory (EEPROM)), embedded microprocessors, firmware, software, etc. Furthermore, aspects of the MIMO communication system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the MIMO communication system is not intended to be exhaustive or to limit the systems and methods to the precise form disclosed. While specific embodiments of, and examples for, the MIMO communication system are described herein for illustrative purposes, various equivalent modifications are possible within the scope of other systems and methods, as those skilled in the relevant art will recognize. The teachings of the MIMO communication system provided herein can be applied to other processing systems and methods, not only for the systems and methods described above.

The elements and acts of the various embodiments described above can be combined to provide further embodiments. These and other changes can be made to the MIMO communication system in light of the above detailed description.

What is claimed is:

1. A method of transmitting data, the method comprising:
    selecting a first plurality of symbols from a set of symbols, the first plurality of symbols representing data;
    encoding the first plurality of symbols to form a second plurality of symbols, each symbol of the second plurality of symbols generated by combining a first part of a first symbol with a second part of a second symbol the first and second symbols selected from the first plurality of symbols; and
    transmitting a combination of the second plurality of symbols using a plurality of antennas, wherein each antenna of the plurality of antennas transmits information of each symbol of the second plurality of symbols over at least two channels;
    wherein the first is a real art of the first symbol and the second art is an imaginary part of the second symbol.

2. The method of claim 1, wherein the set of symbols represent a plurality of points of a rotated constellation.

3. The method of claim 1, wherein the first plurality of symbols includes a set of eight symbols.

4. The method of claim 1, wherein the second plurality of symbols includes a set of eight interleaved symbols.

5. The method of claim 1, wherein the combination of information includes a first four symbols of the second plurality of symbols, and a negative complex conjugate of the first four symbols of the second plurality of symbols.

6. The method of claim 2, further comprising generating the rotated constellation by rotating a constellation that includes the set of symbols when at least one of a real and an imaginary part of one symbol of the set of symbols has a same real or an imaginary part as another symbol of the constellation.

7. The method of claim 6, wherein the rotating includes an angle of approximately $0.5*\tan^{-1}(2)$.

8. The method of claim 1, wherein transmitting further comprises incorporating redundancy in the second plurality of symbols by including a conjugate of an interleaved symbol for each interleaved symbol in the second plurality of symbols.

9. A method of claim 1, wherein transmitting further comprises incorporating redundancy in the second plurality of symbols by forming a negative complex conjugate of an interleaved symbol for each interleaved symbol in the second plurality of symbols.

10. The method of claim 1, wherein transmitting further comprises
identifying a transmitter antenna of a plurality of antennas transmitting interleave symbols without a corresponding redundant interleaved symbol;
providing a greater power to the identified transmitter antenna in response to a weighted average of the number of interleaved symbols.

11. An apparatus for transmitting, the apparatus comprising: an encoder configured to receive a set of eight interleaved symbols corresponding to a set of eight symbols that represent data, each interleaved symbol from the set of eight interleaved symbols being created by combining a first part of one symbol with a second part of one other symbol, the symbol and the one other symbol forming part of the set of eight symbols, and a replication of a conjugate of each interleaved symbol and a negative complex conjugate of each interleaved symbol;
a module coupled to the encoder and configured to arrange an encoded set of eight interleaved symbols in a matrix; and
a transmitter coupled to the encoder and the module, wherein contents of the matrix control transmission of the data by the transmitter, wherein each row of the matrix corresponds to one of the plurality of antennas and each antenna of the plurality of antennas transmits each symbol of the set of eight interleaved symbols over at least two channels;
wherein the first part is a real part of the symbol and the second part is an imaginary part of the other symbol.

12. The apparatus of claim 11, wherein the matrix includes at least three rows and four columns.

13. The apparatus of claim 12, wherein the matrix further comprises:
a first row with a combination of a first interleaved symbol, a negative complex conjugate of a second interleaved symbol from the set of eight interleaved symbols in a first two columns of the matrix, a third interleaved symbol and a negative complex conjugate of a fourth interleaved symbol from the set of eight interleaved symbols in a last two columns of the matrix;
a second row with a combination of a complex conjugate of the first interleaved symbol and the second interleaved symbol from the set of eight interleaved symbols in the first two columns of the matrix and a complex conjugate of the thirds interleaved symbol and the fourth interleaved symbol from the set of eight interleaved symbols in the last two columns of the matrix; and
a third row with a combination of a fifth interleaved symbol, a negative complex conjugate of a sixth interleaved symbol from the set of eight interleaved symbols in a first two columns of the matrix, a seventh interleaved symbol and a negative complex conjugate of an eight interleaved symbol from the set of eight interleaved symbols in a last two columns of the matrix, the first two columns representing a first transmission sub-carrier channel and the last two columns representing a second transmission sub-carrier channel.

14. The apparatus of claim Ii, wherein the set of eight symbols is selected from a set of symbols represented by a rotated constellation, each symbol from the set of symbols is represented in a different manner than another symbol from the set of symbols.

15. The apparatus of claim 14, further comprising rotating the constellation by an angle, $0.5 \tan^{-1}(2)$ if at least one of a real and an imaginary part of one symbol from the set of symbols has at least one of a same real and an imaginary part as another symbol from the set of symbols.

16. The apparatus of claim 13, wherein the matrix further comprises a fourth row representing a fourth transmitter antenna transmitting a combination of the sixth interleaved symbol, a complex conjugate of the fifth interleaved symbol from the set of eight interleaved symbols in a first two columns of the matrix, the eight interleaved symbol and a complex conjugate of the seventh interleaved symbol from the set of eight interleaved symbols in a last two columns of the matrix.

17. The apparatus of claim 12, wherein the matrix further comprises:
a first row with a combination of a first interleaved symbol, a negative complex conjugate of a second interleaved symbol from the set of eight interleaved symbols in a first two columns of the matrix, a third interleaved symbol and a negative complex conjugate of a fourth interleaved symbol from the set of eight interleaved symbols in a last two columns of the matrix;
a second row with a combination of a complex conjugate of the first interleaved symbol and the second interleaved symbol from the set of eight interleaved symbols in the first two columns of the matrix and a complex conjugate of the thirds interleaved symbol and the fourth interleaved symbol from the set of eight interleaved symbols in the last two columns of the matrix; and
a third row with a combination of a fifth interleaved symbol, a negative complex conjugate of a sixth interleaved symbol from the set of eight interleaved symbols in a first two columns of the matrix, a seventh interleaved symbol and a negative complex conjugate of an eight interleaved symbol from the set of eight interleaved symbols in a last two columns of the matrix, the first two columns representing a first transmission sub-carrier channel and the last two columns representing a second transmission sub-carrier channel.

18. The apparatus of claim 13, wherein the matrix further comprises:
a fourth row representing a fourth transmitter antenna being used in a predetermined manner to transmit the set of four interleaved symbols.

19. The apparatus of claim 17, wherein the matrix further comprises:
a fourth row representing a fourth transmitter antenna being used in a predetermined manner to transmit the set of eight interleaved symbols.

20. A system comprising:
an encoding module configured to receive at least one set of eight symbols from a set of symbols;
an interleaving module of the encoding module, the interleaving module configured to interleave each symbol from the set of eight symbols with a corresponding combining symbol to generate a set of eight interleaved symbols corresponding to the set of eight symbols; and
a transmitting module of the encoding module, the transmitting module configured to transmit a combination of the set of eight interleaved symbols using a plurality of antennas, wherein each antenna of the plurality of antennas transmits each interleaved symbol of the set of eight interleaved symbols over the least two channels;
wherein the first part is a real part of the symbol and the second is an imaginary part of the other symbol.

21. The system of claim 20, wherein the combination of information includes a first four interleaved symbols from the set of eight interleaved symbols, a complex conjugate of the first four interleaved symbols and a negative complex conjugate of the first four interleaved symbols.

22. The system of claim 20, wherein the set of symbols is represented by a rotated constellation in which each symbol from the set of symbols is represented in a different manner from each other symbol from the set of symbols.

23. The system of claim 20, wherein each interleaved symbol from the set of eight interleaved symbols comprises information of the symbol and the corresponding combining symbol, the symbol and the corresponding combining symbol forming a part of the set of eight symbols.

24. The system of claim 20, further comprising a rotating module configured to rotate a constellation if at least one of a real and an imaginary part of one symbol of the constellation to generate a rotated constellation.

25. The system of claim 20, wherein the encoding module and the transmitting module are integrated within a single module.

26. The system of claim 25, wherein the single module can be implemented as part of at least one of a base station and a subscriber station.

27. The system of claim 25, wherein the single module is a processor-based module.

28. The system of claim 20, wherein the encoding module and the transmitting module are configured to transmit the set of eight interleaved symbols using an additional transmitter antenna in a predetermined manner.

29. The system of claim 20, wherein the at least one set of eight symbols are transmitted over a wireless medium.

30. A method of transmitting data, the method comprising:
selecting a first plurality of symbols from a set of symbols, the first plurality of symbols representing data;
encoding the first plurality of symbols to form a second plurality of symbols, each symbol of the second plurality of symbols generated by combining a first part of a first symbol with a second part of a second symbol the first and second symbols selected from the first plurality of symbols; and
transmitting a combination of the second plurality of symbols using a plurality of antennas, wherein each antenna of the plurality of antennas transmits information of each symbol of the second plurality of symbols over at least two channels;
wherein the first plurality of symbols is selected from a set of symbols represented by a rotated constellation, each symbol from the first plurality of symbols is represented in a different mariner than another symbol from the set of symbols;
further comprising rotating the constellation by an angle, 0.5 tan--1(2) if at least one of a real and an imaginary part of one symbol from the plurality of symbols has at least one of a same real and an imaginary part as another symbol from the plurality of symbols.

31. An apparatus for transmitting, the apparatus comprising:
an encoder configured to receive a set of eight interleaved symbols corresponding to a set of eight symbols that represent data, each interleaved symbol from the set of eight interleaved symbols being created by combining a first part of one symbol with a second part of one other symbol, the symbol and the one other symbol forming part of the set of eight symbols, and a replication of a conjugate of each interleaved symbol and a negative complex conjugate of each interleaved symbol;
a module coupled to the encoder and configured to arrange the set of eight interleaved symbols in a matrix; and
a transmitter coupled to the encoder and the module, wherein contents of the matrix control transmission of the data by the transmitter, wherein each row of the matrix corresponds to one of the plurality of antennas and each antenna of the plurality of antennas transmits each symbol of the set of eight interleaved symbols over at least two channels;
wherein the set of eight symbols is selected from a set of symbols represented by a rotated constellation, each symbol from the set of symbols is represented in a different manner than another symbol from the set of symbols; and
further comprising rotating the constellation by an angle, 0.5 tan–1(2) if at least one of a real and an imaginary part of one symbol from the set of symbols has at least one of a same real and an imaginary part as another symbol from the set of symbols.

32. A system comprising:
an encoding module configured to receive at least one set of eight symbols from a set of symbols;
an interleaving module of the encoding module, the interleaving module configured to interleave each symbol from the set of eight symbols with a corresponding combining symbol to generate a set of eight interleaved symbols corresponding to the set of eight symbols; and
a transmitting module of the encoding module, the transmitting module configured to transmit a combination of the set of eight interleaved symbols using a plurality of antennas, wherein each antenna of the plurality of antennas transmits each interleaved symbol of the set of eight interleaved symbols over the least two channels;
wherein the set of eight symbols is selected from a set of symbols represented by a rotated constellation, each symbol from the set of symbols is represented in a different manner than another symbol from the set of symbols; and
further comprising rotating the constellation by an angle, 0.5 tan–1(2) if at least one of a real and an imaginary part of one symbol from the set of symbols has at least one of a same real and an imaginary part as another symbol from the set of symbols.

* * * * *